April 21, 1953 R. P. FOX ET AL 2,635,724
CLUTCH FOR HAND POWER WINCHES
Filed May 17, 1948
2 SHEETS—SHEET 1

Inventor
Robert P. Fox
Ola L. Berby
By Robert M. Dunning

April 21, 1953  R. P. FOX ET AL  2,635,724
CLUTCH FOR HAND POWER WINCHES

Filed May 17, 1948  2 SHEETS—SHEET 2

Inventor
Robert P. Fox
Ola L. Berby
By Robert M. Dunning

Patented Apr. 21, 1953

2,635,724

UNITED STATES PATENT OFFICE 2,635,724

CLUTCH FOR HAND POWER WINCHES

Robert P. Fox and Ola L. Berby, Duluth, Minn., assignors to Clyde Iron Works, Inc., Duluth, Minn., a corporation of Minnesota Application May 17, 1948, Serial No. 27,406

8 Claims. (Cl. 192—16)

Our invention relates to an improvement in clutch and hand power winches wherein it is desired to provide a simple means for controlling the lifting and lowering of the winch load.

An object of the present invention lies in the provision of a simple controller for hand power winches. These winches are usually provided with a crank by means of which the hoisting drums may be rotated to lift the load. Ratchet means are often provided in such devices for holding the load at any desired elevation. A separate brake is often provided by means of which the lowering of the load may be accomplished. When it is desired to lower the load, the hand brake is set and the ratchet released, thus allowing the load to be lowered under control of the hand brake.

A feature of the present invention lies in the provision of a clutch interposed between the crank and the hoisting drums. This clutch is controlled by the crank handle used to lift the load. When the crank handle is rotated in one direction the winding drum is rotated in a direction to lift the load. When the crank handle is rotated slightly in the opposite direction, a friction brake is released allowing the load to drop under control of the friction brake.

A feature of the present invention lies in the fact that the clutch incorporates a spring loaded friction brake which remains set during elevation of the load and a spring loaded pawl which cooperates with a ratchet to hold the load at any elevation. Rotation of the crank handle in a reverse direction releases the spring loaded friction brake, while the pawl remains engaged with its ratchet. As a result the lowering of the load can be controlled by the same crank handle used to raise the load.

These and other objects and novel features of our invention will be more clearly and fully set forth in the following specification and claims.

In the drawings forming a part of our specification:

Figures 1, 2:
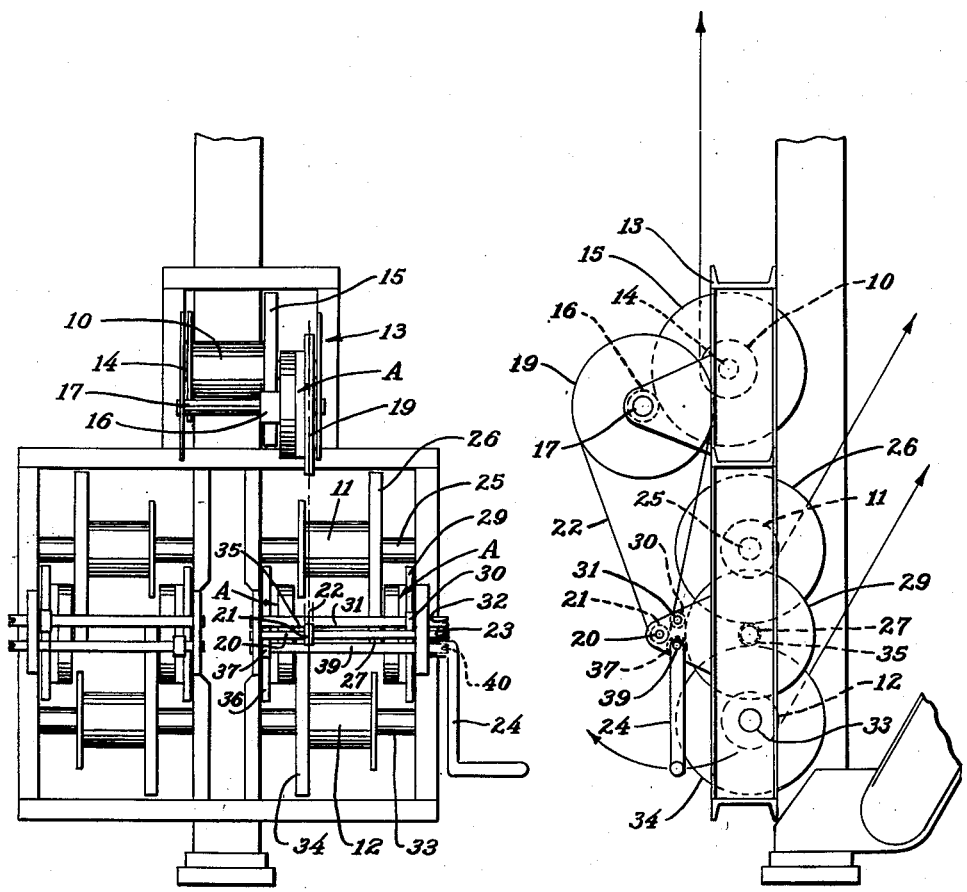
Figure 1 is a front elevational view of a hand power winch or derrick on which our safety clutch is used.
Figure 2 is a side elevational view of the device shown in Figure 1.

Figure 1 of the drawing shows a typical installation in which the clutch may be used. One such clutch may be provided between each drum and its crank. For the purpose of illustration a structure is shown embodying a boom peaking line drum 10, a boom point line drum 11, and a boom center line drum 12. All of these drums are mounted in a suitable supporting frame indicated in general by the numeral 13. The drum 10 is mounted upon a supporting shaft 14 and is provided with an integral or attached gear 15 driven by a pinion 16 on a parallel shaft 17. A clutch unit A is mounted upon the shaft 17 and is equipped with a sprocket 19 through which driving power is transmitted. A shaft 20 is mounted in the frame 13 and supports a sprocket 21 connected with the sprocket 19 by a suitable chain 22. The shaft 20 is provided with a notched end 23 designed to accommodate a crank 24 by means of which the shaft may be rotated. Thus the boom peaking line may be wound about the drum 10 by action of the crank 24. This crank 24 may also be operated to lower the boom through actuation of the clutch A as will be later described.

The boom point line drum 11 is mounted upon a shaft 25 and is provided with an integral or attached gear 26 which is in mesh with a pinion 27 mounted on the shaft of another clutch unit A. This clutch unit A is provided with an integral gear 29 which meshes with a pinion 30 on a shaft 31. The shaft 31 is provided with a notched end 32 which is engageable with a crank 24. Thus the crank 24 may act to wind the boom point line about the drum 11 or may operate through the associated clutch unit A to lower the load as will be later described. The boom center line drum 12 is mounted upon a supporting shaft 33 and is provided with an attached gear 34 which may mesh with a pinion 35 on the shaft of a third clutch unit A. This clutch unit A is provided with a drive gear 36 in mesh with a pinion 37 on the drive shaft 39. The drive shaft 39 is provided with a notched end 40 which is engageable with the crank 24. By rotation of the crank 24 in one direction, the drum 12 may be rotated to wind the boom center line thereupon. Rotation of the crank handle 24 in the opposite direction will actuate the associated clutch unit A in conjunction therewith to lower the boom center line as will be later described. Other cable drums may similarly be provided on which load lines of various types may be wound. Each drum may be driven through an individual clutch unit A which permits the load line to be wound upon the corresponding drum, or unwound therefrom under control of a friction brake as will be later pointed out.

Figure 3:
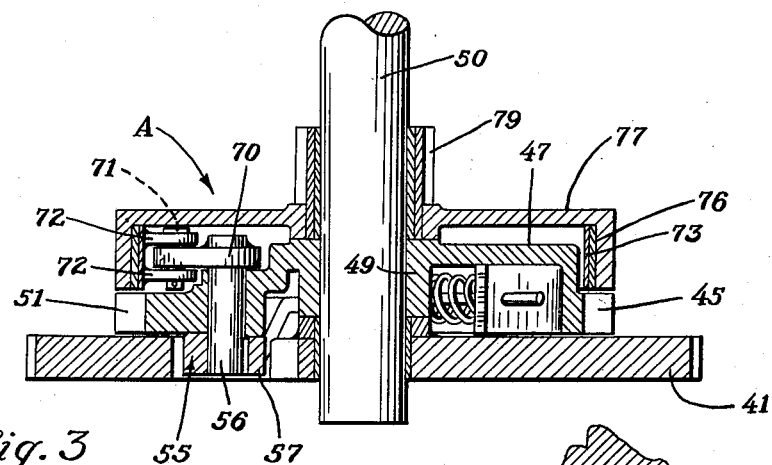
Figure 3 is a sectional view through the clutch showing the construction thereof.
Figure 4:
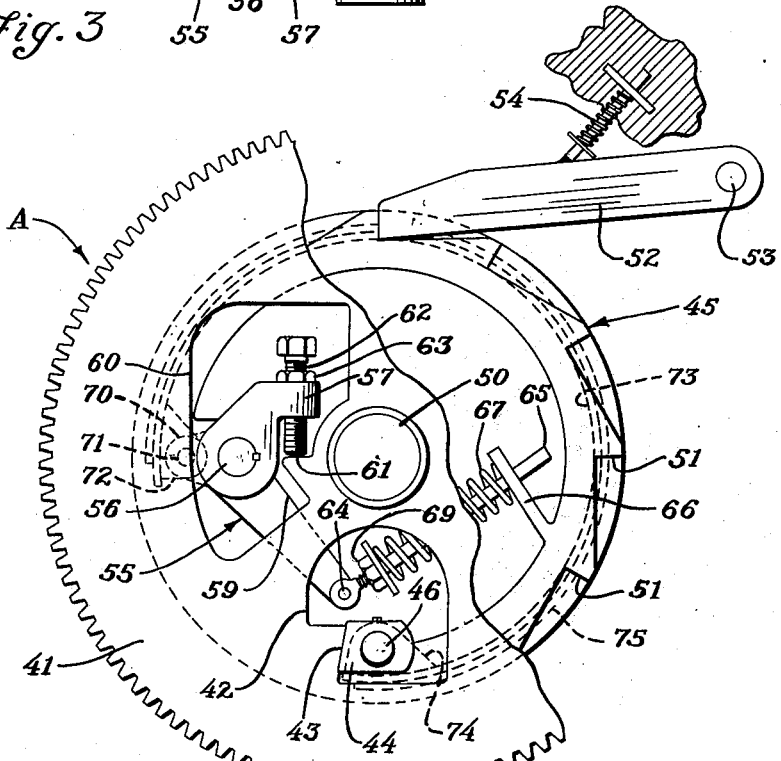
Figure 4 is an elevational view of the clutch, a portion thereof being broken away to better show the construction.

The clutch units A which have been described vary somewhat in their specific construction as some of these units are driven by a gear and others may be driven by a sprocket. In the constructions illustrated, two of the clutches A have been described as being driven by gears 29 and 36, while a third unit A has been described as being driven by a sprocket 19. Obviously the particular details of the drive means is not important and accordingly in Figures 3 and 4 of the drawings we have disclosed the drive member as a gear designated by the numeral 41. In other respects the clutches A are similar; and accordingly only one clutch unit A is shown in detail.

The gear 41 is provided with an aperture 42 therein which is of irregular shape. The aperture 42 forms a shoulder 43 along one edge thereof. This shoulder 43 is engageable with a drive lug 44 mounted upon the ratchet 45. The drive lug 44 is mounted upon a pin 46 which extends through the ratchet 45 and forms a dead end for a brake band as will be later described. The ratchet 45 includes a disc like body 47 having a hub 49 mounted upon the supporting shaft 50 and this ratchet is also provided with peripheral teeth 51 in angularly spaced relationship. The teeth 51 are successively engaged by a pawl 52 which is pivoted to a fixed point on the frame 53 and which is urged by a spring 54 into engagement with the ratchet teeth.

A bell crank lever 55 is secured for rotation with a pivot pin 56 which extends through the ratchet 45. One arm 57 of the bell crank lever 55 is off-set from the other lever arm 59 and extends through an irregular aperture 60 in the gear 41. The aperture 60 is provided with a shoulder 61 which is engageable with an adjustment screw 62 extending through the arm 57. A locking nut 63 allows the adjusting screw 62 to be held in any adjusted position. The screw 62 is supported to provide a slight clearance between the end of the screw and the shoulder 61 for a purpose which will be later described in detail.

The arm 59 of the bell crank lever 55 is pivotally connected at its extremity 64 to a guide rod 65 extending through a rib 66 on the ratchet 45. A spring 67 encircles the guide rod 65 between an adjustment nut 69 and the rib 66 to urge the bell crank lever 55 in a clockwise direction as viewed in Figure 4. An arm 70 is secured to the pivot 56 to rotate in unison therewith and in unison with the bell crank lever 55. This arm 70 is pivotally connected at 71 by a suitable pivot pin between a pair of lugs 72 on the end of the brake body 73. The other end of the brake body 73 is provided with a suitable lug 74 which is pivotally supported on the pivot pin 46. The pivot pin 46 forms the dead end of the brake body 73, while the pivot 71 is provided at the live end thereof. Rotation of the bell crank lever 55 in a clockwise direction as viewed in Figure 4 of the drawings will urge the brake lining 75 on the brake shoe 73 against the inner surface of the brake drum 76. The brake drum 76 is supported upon a suitable disc like support 77 which is keyed or otherwise attached to the pinion 79. The pinion 79 forms the driven member which acts to rotate the winding drum. Obviously the winding drum could be directly connected to the brake drum 76 or may be connected through any suitable system of gears or the like.

In operation the gear 41 is rotated in a counter-clockwise direction in hoisting the load. As the gear is rotated the shoulder 43 thereon engages the drive lug 44 and directly contacts this portion of the ratchet 45. As a result the ratchet 45 is likewise driven in a counter-clockwise direction, the pawl 52 successively engaging the teeth 51 and holding the ratchet in any desired position. The spring 67 is during this movement, urging the bell crank lever 55 in a clockwise direction as viewed in Figure 4, thus expanding the brake shoe 73 against the brake drum 76 and causing rotation of this brake drum in unison with the ratchet and the gear. During the hoisting operation the brake shoe and its lining are in constant engagement with the brake drum 76 and there is no relative rotation between the ratchet and the brake drum.

When it is desired to hold the load at any desired location the ratchet 51 engages the pawl 52 to prevent a reverse rotation of the ratchet. When it is desired to lower the load, the gear 41 is rotated slightly in a clockwise direction as viewed in Figure 4. This motion tends to move the gear 41 relative to the ratchet 45 which is held stationary by the pawl 52. This slight reverse rotation of the gear 41 withdraws the pressure of the shoulder 43 against the drive lug 44 and rotates the shoulder 61 against the adjusting screw 62. As the shoulder 61 engages the adjusting screw 62 the bell crank lever 55 is rotated in a counter-clockwise direction. This moves the arm 70 in a counter-clockwise direction, compressing the spring 67 to some extent and drawing the live end of the brake shoe and its lining from the brake drum 76. As a result the weight of the load allows the brake drum to rotate, this motion rotating the brake drum 76 relative to the fixed ratchet 45.

The pressure of the brake band against the drum 76 is at all times controlled by the movement of the gear 41, as by rotating this gear in a clockwise direction relative to the ratchet the pressure on the brake band can be released a desired amount. When it is desired to stop downward movement of the load, the force tending to rotate the gear 41 in a clockwise direction is released and the spring 67 again urges the brake band against the drum and stops movement of the load.

In actual practice the gear 41 is driven in either direction by the crank handle 24 as has been previously described. However, rotation of the crank in one direction will tend to wind the cable about the drum and rotation of the crank handle in the opposite direction will release the brake mechanism and allow the load to drop.

In accordance with the patent statutes, we have described the principles of construction and operation of our clutch and hand power winches, and while we have endeavored to set forth the best embodiment thereof, we desire to have it understood that obvious changes may be made within the scope of the following claims without departing from the spirit of our invention.

We claim:

1. A drive mechanism for use in hand power winches including a rotatable drive member, a coaxial drive member, and a coaxial ratchet, abutment means on said ratchet, shoulder means on said drive member engageable with said abutment means upon rotation of said drive member in one direction to drive said ratchet in unison therewith, a fixed pawl in engagement with said ratchet to hold said ratchet from rotation in a reverse direction, a friction brake between said ratchet and said driven member, resilient means normally urging said friction brake into engaging position to positively cause rotation of said driven member in unison with said ratchet, and means cooperable between said friction brake while said ratchet is held from reverse rotation and said drive member to at least partially overcome the action of said resilient means to release said friction brake while said ratchet remains stationary upon rotation of said drive member in the reverse direction.

2. The structure described in claim 1 in which the friction brake includes brake shoe means mounted upon the ratchet for rotation therewith, and brake drum means cooperable with said brake shoe means and mounted for rotation with said driven member.

3. A drive means for use in a hand power winch including a rotatable drive member mounted for manual rotation in either direction, a ratchet coaxial with said drive member, means on said drive member cooperable with said ratchet for rotating said ratchet in unison with said drive member when said drive member is rotated in one direction, a driven member, a friction brake interposed between said driven member and said ratchet, a pawl engageable with said ratchet to hold said ratchet from rotation in a reverse direction, means normally urging said friction brake into engaging position to cause rotation of said driven member in unison with said ratchet, and friction brake releasing mechanism, said releasing mechanism including means on said drive member and cooperable means on said ratchet engageable with said last named means upon rotation of said drive member in a reverse direction relative to said ratchet for releasing said friction brake and permitting rotation of said driven member relative to said ratchet.

4. A drive mechanism for use in winches and the like including a rotatable drive member, a second rotatable member coaxial with said drive member, an abutment on said second rotatable member, shoulder means on said drive member cooperable with said abutment on said second rotatable member for causing rotation of said second rotatable member upon rotation of said drive member in one direction, means for holding said second rotatable member from rotation in a reverse direction, a driven element, a brake between said second rotatable member and said driven member, resilient means normally urging said brake into engaging position, and means cooperable between said drive member and said brake for overcoming the bias of said resilient means and thereby releasing said brake upon reverse rotation of said drive member while said ratchet remains stationary.

5. A drive mechanism for use in winches and the like including a rotatable drive member, a fixed stop thereon, a second rotatable member coaxial with said drive member, lug means on said second rotatable member engageable with said fixed stop upon rotation of said drive member in one direction to cause rotation of said rotatable members in unison, a driven member, a friction brake interposed between said second rotatable member and said driven member, means normally biasing said brake into engaged position to cause rotation of said driven member in unison with said second rotatable member, and brake releasing means cooperable with said drive member upon rotation of said drive member in a reverse direction relative to said second rotatable member while said ratchet remains stationary for overcoming the bias of said biasing means.

6. A drive mechanism for use in winches and the like including a rotatable drive member, a second rotatable member coaxial therewith, means on said drive member and cooperable means on said second rotatable member engageable therewith in contacting relation upon rotation of said drive member in one direction to positively rotate said rotatable members in unison, means for holding said second rotatable member from continued rotation in a reverse direction, a driven member, a friction brake between said second rotatable member and said driven member, means normally biasing said friction brake into engaging position to cause rotation of said driven member in unison with said second rotatable member, brake releasing means for overcoming the bias of said biasing means, and means on said drive member engageable with said brake releasing means upon rotation of said drive member relative to said second rotatable member in a reverse direction while said ratchet remains stationary to actuate said brake releasing means in a direction to overcome the bias of said biasing means and thereby release said friction brake.

7. A drive means for use in winches and the like including a rotatable drive member, a second rotatable member coaxial therewith, cooperable means on said drive means and said second rotatable member engageable upon rotation of said drive member in one direction to rotate said two rotatable members in unison, means for holding said second rotatable member from continued rotation in a reverse direction, a brake shoe supported on said second rotatable member, a bell crank lever connected to said brake shoe to move said brake shoe into and out of engagement with its drum, a brake drum coaxial with said rotatable members and rotatable relative thereto, resilient means normally urging said bell crank lever in one rotative direction to urge said friction brake against its drum, and means on said drive member engageable with said bell crank lever upon rotation of said drive member in a reverse direction relative to said second rotatable member for moving said brake shoe away from its drum.

8. A drive for use in winches and the like including a rotatable drive member, a second rotatable member, and a third rotatable member, said rotatable members being coaxial, cooperable means on said drive member and on said second rotatable member, rotation of said drive member in one direction rotating said second rotatable member in unison with said drive member, a brake drum connected to said third rotatable member for rotation therewith, a brake shoe supported by said second rotatable member and engageable with said brake drum, means for urging said brake shoe into engaged position and causing said second and third rotatable members to rotate in unison, and means for holding said second rotatable member from continued rotation in a reverse direction, lever means connected to said brake shoe for actuating the same, and means on said drive member engageable with said lever means upon rotation of said drive member in a reverse direction to release said brake shoe from said drum.

ROBERT P. FOX.
OLA L. BERBY.

References Cited in the file of this patent

UNITED STATES PATENTS

| Number | Name | Date |
|---|---|---|
| 1,154,508 | Graumuller | Sept. 21, 1915 |
| 1,438,394 | Packer | Dec. 12, 1922 |
| 2,088,648 | Hansen | Aug. 3, 1937 |

FOREIGN PATENTS

| Number | Country | Date |
|---|---|---|
| 409,719 | France | Apr. 29, 1910 |